(12) United States Patent
Zheng et al.

(10) Patent No.: US 11,149,716 B2
(45) Date of Patent: Oct. 19, 2021

(54) OFFSHORE WIND-SOLAR-AQUACULTURE INTEGRATED FLOATER

(71) Applicant: Tsinghua Shenzhen International Graduate School, Guangdong (CN)

(72) Inventors: Xiangyuan Zheng, Guangdong (CN); Huadong Zheng, Guangdong (CN); Yi Li, Guangdong (CN)

(73) Assignee: Tsinghua Shenzhen International Graduate School, Guangdong (CN)

( * ) Notice: Subject to any disclaimer, the term of this patent is extended or adjusted under 35 U.S.C. 154(b) by 0 days.

(21) Appl. No.: 17/039,267

(22) Filed: Sep. 30, 2020

(65) Prior Publication Data
US 2021/0025369 A1    Jan. 28, 2021

Related U.S. Application Data

(63) Continuation of application No. PCT/CN2020/082537, filed on Mar. 31, 2020.

(30) Foreign Application Priority Data

Apr. 28, 2019    (CN) .......................... 201910351564.2

(51) Int. Cl.
*F03D 13/25*    (2016.01)
*A01K 61/65*    (2017.01)
(Continued)

(52) U.S. Cl.
CPC .............. *F03D 13/25* (2016.05); *A01K 61/65* (2017.01); *B63B 35/44* (2013.01); *F03D 9/25* (2016.05);
(Continued)

(58) Field of Classification Search
CPC . F03D 13/25; F03D 9/25; F03D 3/005; F03D 9/007; F03D 9/255; A01K 61/65;
(Continued)

(56) References Cited

U.S. PATENT DOCUMENTS 8,441,139 B2 * 5/2013 Karimi ...................... F03D 9/25
                                                                     290/53
2011/0037264 A1 * 2/2011 Roddier .................... F03D 9/25
                                                                     290/44
(Continued)

FOREIGN PATENT DOCUMENTS

CA         2984197 A1 * 11/2017 ............ A01K 61/60
CN       107878698 A      4/2018
(Continued)

*Primary Examiner* — Joseph Ortega
(74) *Attorney, Agent, or Firm* — Hamre, Schumann, Mueller & Larson, P.C.

(57) ABSTRACT

An offshore wind-solar-aquaculture integrated floater is provided, including vertical-axis wind turbine systems, solar photovoltaic panels, and a cube aquaculture cage. Four vertical-axis wind turbine systems are respectively rigidly connected to four corners of the cage; solar photovoltaic panels and a living and working quarter are located on cage deck; and side frames of the cage are equipped with tensile nets, the bottom frame of cage is equipped with a bottom net, and columns of the cage are equipped with lifting rails. This floater has good stability, sea-keeping performance and high strength. Utilizations of offshore wind and solar energy above the cage are high and they complement each other in power generation. This disclosure manages to exploit ocean resources to an unprecedentedly large extent, while resolving the issue of combing power generation with marine aquaculture in moderate and deep seas.

9 Claims, 6 Drawing Sheets

(51) Int. Cl.
  *B63B 35/44* (2006.01)
  *F03D 9/25* (2016.01)
(52) U.S. Cl.
  CPC . *B63B 2035/446* (2013.01); *B63B 2035/4453* (2013.01)
(58) Field of Classification Search
  CPC .............................. A01K 61/60; B63B 35/44; B63B 2035/4453; B63B 2035/446; Y02P 60/60; Y02E 10/74; Y02E 10/727; Y02E 10/50; Y02A 40/81; H02S 10/12
  See application file for complete search history.

(56) References Cited

U.S. PATENT DOCUMENTS

| | | | | |
|---|---|---|---|---|
| 2011/0241347 A1* | 10/2011 | Boureau | ................ | F03D 13/10 290/53 |
| 2012/0086206 A1* | 4/2012 | Karimi | ................... | H02S 10/12 290/53 |
| 2012/0139255 A1* | 6/2012 | Zhu | ........................ | F03D 13/25 290/55 |
| 2013/0099496 A1* | 4/2013 | Solheim | ................ | A01K 61/60 290/44 |
| 2015/0211477 A1* | 7/2015 | Wright | ................... | F03D 13/10 290/53 |
| 2020/0022341 A1* | 1/2020 | Li | ........................ | A01K 61/60 |
| 2020/0392946 A1* | 12/2020 | Wong | ..................... | F03D 13/25 |

FOREIGN PATENT DOCUMENTS

| | | |
|---|---|---|
| CN | 109263819 A | 1/2019 |
| CN | 109278950 A | 1/2019 |
| CN | 109555650 A | 4/2019 |
| CN | 110050740 A | 7/2019 |
| CN | 209964974 U | 1/2020 |
| KR | 1020120139154 A | 12/2012 |

* cited by examiner

OFFSHORE WIND-SOLAR-AQUACULTURE INTEGRATED FLOATER

CROSS REFERENCE TO RELATED APPLICATIONS

This application is a continuation application of PCT/CN2020/082537 filed on 2020 Mar. 31, which claims priority to CN patent application NO. 201910351564.2 filed on 2019 Apr. 28. The contents of the above-mentioned application are all hereby incorporated by reference.

BACKGROUND

Field of the Invention

The present invention relates to the field of offshore wind-solar complementation and aquaculture, and in particular, to an offshore wind-solar-aquaculture integrated floater integrating vertical-axis wind turbine systems, solar photovoltaic panels, and a steel-fishing cage.

Related Arts

World coastal wind power is very rich. Development and utilization of the wind resources are not only an important path for current energy restructuring and energy conservation and emission reduction, but also an inevitable choice for future sustainable energy development and transformation of economic and social development. As of the end of 2019, global newly added grid-connected wind power installed capacity reached 60 Gigawatts(GW), accounting for more than 9% of the historically accumulated capacity of 650 GW. Merely in 2019, the global newly connected wind power from the offshore areas amounted to 5.2 GW. Onshore wind power exploitable regions gradually shrink and by contrast offshore wind farms are rapidly expanding their zones.

There are mainly two types of offshore wind turbines: vertical-axis and horizontal-axis. The horizontal-axis wind turbine has been popularly adopted in wind power industry, dominating more than 98% of land and offshore markets. Its technology is fairly mature, and the electricity generation efficiency is higher than the vertical-axis counterpart. However, there are limitations in the horizontal-axis wind turbines: (1) the generator is very heavy, in the scale of multi-hundred metric tons, but is installed at a high altitude of more than 100 meters above sea level. Thus for the whole wind turbine structure, its center of gravity is so high that stability becomes a concern. Also, high altitude makes installation of nacelle and blades and consequent maintenance more difficult, causing marine operations to be rather costly; (2) in order to avoid unfavorable wake effects, it is required that the adjacent distance between two neighboring horizontal-axis wind turbines be large, generally 5 to 8 times the rotator's radius, i.e. some 400 m to 800 m. This in turn lowers the power efficiency of a wind farm. Therefore, the design of multiple horizontal-axis wind turbines sitting on a confined space like a marine floating structure is very difficult to come true.

Compared with the horizontal-axis wind turbine, the vertical-axis wind turbine is still in the beginning stage around the world. However, the vertical-axis wind turbine has better features such as a more stable performance and a much lower center of gravity. The control system, the transmission system, and the electricity generation system of a vertical-axis wind turbine normally are located at the root of the wind turbine, so that most of the weight is at a very low altitude, leading to much better stability as compared to the horizontal-axis wind turbines. Moreover, devices thereof do not include the variable pitch system or the yaw system that is inherent in a horizontal-axis wind turbine, so that costs for operation and maintenance are much lower. In addition, the required clear distance between adjacent vertical-axis wind turbines is much smaller. The adjacent vertical-axis wind turbines, on the contrary to the horizontal-axis situations, may even have a synergistic effect that improves overall average electricity generation efficiency. Therefore, it is possible to develop an idea of sharing the same floating foundation at sea by multiple vertical-axis wind turbines. The total power thereof is comparable to that of a single high-power horizontal-axis wind turbine based on same area and cost.

On the other hand, in Asia-Pacific, South America and Northern Europe, marine aquaculture still rapidly grows in this modern era. At present, the high-density polyethylene (HDPE) cage structure is the mainstream aquaculture technology adopted for offshore fish farming. Although the HDPE cage is low in cost, its structural strength is vulnerable to resist severe seas, and the maximum deployment water depth usually does not exceed 30 meters. Suffering heavy losses in typhoons or hurricanes therefore is still a great challenge in marine fishery industry. In 2017, Ocean Farm 1, which is the world's first steel and semi-submersible aquaculture cage, came into being for salmon aquaculture in Norway. This milestone floater, of diameter 110 m, officially opens a door for modern deep-sea and large-scale marine aquaculture.

The present development of offshore aquaculture technology and the development of offshore wind turbines have a trend in common. Both of them are moving from shallow water to deep sea. Deep seas not only have fast and constant wind speeds but also possess clean water.

Solar energy at sea is also very abundant and stable. So far most of solar panels can be seen only on lakes and very few coastal areas. Compared to the wind energy, the solar energy is more stable in daytime. It becomes a useful complementation for land and offshore wind power generation. Therefore, designing an engineering structure to make full use of wind, sunlight, and water resources in oceans is a huge challenge that the global engineering community faces.

The Chinese patent document CN109555650A discloses a floater technology integrating a vertical-axis wind turbine with a cage. The upper half of the wind turbine includes first, second and third blades, first, second and third upper support beams, first, second and third lower support beams, an upper support beam mounting plate, a lower support beam mounting plate, a rotating shaft and a wind turbine tower barrel, where: two ends of the first blade are respectively fixed to the first upper support beam and the first lower support beam through bolt connection, and then the first upper support beam and the first lower support beam are respectively inserted into the upper support beam mounting plate and the lower support beam mounting plate, and are fixed; two ends of the second blade are respectively fixed to the second upper support beam and the second lower support beam through bolt connection, and then the second upper support beam and the second lower support beam are respectively inserted into the upper support beam mounting plate and the lower support beam mounting plate, and are fixed; two ends of the third blade are respectively fixed to the third upper support beam and the third lower support beam through bolt connection, and then the third upper support beam and the third lower support beam are respectively inserted into the upper support beam mounting plate and the lower support beam mounting plate, and are fixed; the upper support beam mounting plate and the lower support beam mounting plate are respectively connected to the rotating shaft, and the rotating shaft penetrates into the wind turbine tower barrel and is connected, through a gear, to an electricity generation device mounted inside the wind turbine tower barrel. When the wind blows through the blades, the foregoing mounted structures can rotate together around the rotating shaft, to satisfy a basic condition of wind electricity generation. The lower half of this concept is a semi-submersible floating platform, in geometry of a hexagonal cube. A top panel and a bottom panel thereof are made of stainless steel, having circular holes respectively placed in the centers of the two panels, and are then welded to the wind turbine tower barrel. Six rectangular stainless steel plates are welded between the top panel and the bottom panel in a circle and are welded to each of the top panel and the bottom panel, to form an enclosed space, and act as a floater, so that the structure can float in the water; a bottom structure of the cage part is in a double-ring design, and a bottom inner ring and a bottom outer ring are welded to each other through N number of bottom outer ring transverse metal support rods. After the wind turbine tower barrel passes through the top panel and the bottom panel of the semi-submersible floating platform, the bottom of the wind turbine tower barrel is rigidly connected, through welding, to N number of bottom inner ring transverse metal support rods disposed on the bottom inner ring, and N number of metal support rods are disposed on the bottom panel of the semi-submersible floating platform, and are respectively welded to the bottom outer ring. An aquaculture net is used around the N number of metal support rods for wrapping, to form a cage for actual production. The bottom of the cage part is welded with N number of anchor chains and fixed to the sea floor. In addition, a cable is mounted at the bottom of the cage part. One end of the cable is connected to the electricity generation device in the wind turbine tower barrel, the other end of the cable is connected to a substation, and electricity is transmitted to users after being processed.

However, such an integrated structure disclosed by CN109555650A can only accommodate a single vertical-axis wind turbine, meaning that the synergistic advantage cannot be exploited by multiple wind turbines. As a result, space above the cage is greatly wasted, leading to low electricity generation capacity. Furthermore, the structure in this concept cannot utilize solar energy at sea. This structure is a semi-submersible floater whose stability, motion and damping performances are all challenging issues. In addition, this floater does not have a living or working quarter to carter staffs on board to carry out activities such as fishing and wind turbine maintenance. What is more, only a single species of fish can be raised in the cage, restricting the offshore application of this concept.

SUMMARY

The objective of the present invention is to develop an offshore wind-solar-aquaculture integrated floater suitable for moderate and deep seas, so as to resolve the foregoing problems in the prior art.

An offshore wind-solar-aquaculture integrated floater suitable for moderate and deep seas sequentially includes, from top to bottom, vertical-axis wind turbine systems, wind turbine towers, a living and working quarter, solar photovoltaic panels, a cage, and a mooring system, where the cage is a cube, four vertical-axis wind turbine systems are respectively rigidly connected to four corners of the cage through corresponding wind turbine towers, and electricity generators of vertical-axis wind turbine systems are placed inside the cage main columns; the solar photovoltaic panels are distributed on the deck of cage; the living and working quarter is also constructed on the deck of cage; and the mooring system is connected to the cage, designed to moor the floater to sea floor for station-keeping purpose.

The cage is a steel frame, whose four side facets and bottom are installed with tensile metal nets. The cage is equipped with lifting rails which are used to lift the bottom net up and down for the purpose of catching fish conveniently.

Further, the cage frame includes multiple top crossed braces, top side braces side columns, side braces, bottom crossed pontoons, bottom side pontoons, and corner columns, as well as a center column.

The corner columns are located in four corners of the cage, lower ends of the wind turbine towers are rigidly connected to upper ends of the corner columns, preferably, their center lines thereof are aligned with each other; and the electricity generators of the wind turbine systems are placed inside the corner columns, which helps to lower the overall center of gravity of the structure;

The side columns are located at the center of four side frames of the cage, and the center column is located in the center of the cage;

one end of each of the top side braces is rigidly connected to the upper end of the corner column, and the other end is rigidly connected to an upper end of the side column; one end of each of the top crossed braces is rigidly connected to the upper end of the corner column, and the other end is rigidly connected to an upper end of the center column, and the top crossed braces are in an "X" shape; all the top side braces and all the top crossed braces jointly form a top frame of the cage, and the center column, the corner columns, and the side columns are perpendicular to this top frame; and the living and working quarter is located at the intersection point of the top crossed braces;

multiple side braces are laid on the four side frames of the cage, one end of the side frame support is rigidly connected to the upper end of the side column, the other end is rigidly connected to a lower end of the corner column, and the side braces are in an inverted "V" shape on each side frame;

one end of each of the bottom side pontoons is rigidly connected to the lower end of the corner column, and the other end is rigidly connected to a lower end of the side column; one end of each of the bottom crossed pontoons is rigidly connected to the lower end of the corner column, the other end is rigidly connected to a lower end of the center column, and the bottom crossed pontoons are in an "X" shape; all the bottom crossed pontoons and all the bottom side pontoons jointly form a bottom frame of the cage, and the center column, the corner columns, and the side columns are perpendicular to the bottom frame.

Further, the cage is a steel structure. Sizes and material properties of all structural components of the same name are identical, and the structural components of the same name are symmetrically distributed about the center column spatially.

Further, the mooring system is connected to the cage through fairleads at the lower ends of the corner columns.

Further, at least one of the bottom crossed pontoons, the bottom side pontoons, lower middle portions of the corner columns, lower middle portions of the side columns, and a lower middle portion of the center column contain ballast tanks.

Further, the lifting rails are located on the corner columns and the center column, and extend vertically upwards from the lower ends of the corner columns and the center column to top ends of the corner columns and the center column; and there is a lifting rail on an inner side of each of the corner columns; and there are four lifting rails on the center column that are in four orientations of the southeast, the northeast, the southwest, and the northwest, the lifting rail in each orientation of the center column being located opposite to the lifting rail on the corner column.

Further, the bottom net includes outer circumferential net ribs, multiple bottom radial net ribs, an inner circumferential net rib, and a net sheet, where the outer circumferential net ribs forms a periphery of the bottom net, the inner circumferential net rib is located at a center portion of the bottom net and surrounds the center column; the bottom radial net ribs radiate outwards at equal angles along the inner circumferential net rib until intersecting with the outer circumferential net ribs, and two ends of the bottom radial net rib are respectively connected to the outer circumferential net ribs and the inner circumferential net rib; and the net sheet is fixed to the outer circumferential net ribs, the bottom radial net ribs, and the inner circumferential net rib.

Further, the bottom net is connected to the lifting rails through the outer circumferential net ribs and the bottom radial net ribs.

Further, the inner space of the cage is divided into four triangular aquaculture regions by the corner columns, the center column, the top crossed braces, the top side braces, the bottom crossed pontoons, and the bottom side pontoons, a separation barrier, for example, a net, is placed between neighboring triangular aquaculture regions, and the bottom net in each of the aquaculture regions is individually retracted and released along the corresponding lifting rail, and the bottom net is lifted to a place near the water surface along the lifting rails in a fish collecting stage, to implement retraction and release.

Further, fishing operation corridors and passages are placed on the top crossed braces and the top side braces, and the fishing operation corridors and the passages are connected to the living and working quarter.

Further, fenders are further installed on outer sides of the top side braces.

Further, the solar photovoltaic panels are installed onto the deck of the cage through a truss support system, and are in the shape of a truncated pyramid.

The present invention has the following beneficial effects:

The offshore wind-solar-aquaculture integrated floater of the present invention includes, from top to bottom, vertical-axis wind turbine systems, wind turbine towers, a living and working quarter, solar photovoltaic panels, a cage, and a mooring system, where the cage is a cube, four vertical-axis wind turbine systems are respectively rigidly connected to four corners of the cage through corresponding wind turbine towers; the living and working quarter is constructed on the deck of the cage; the solar photovoltaic panels are installed on the deck of the cage, and are preferably in the shape of a truncated pyramid; and the mooring system is connected to the cage, and moors the offshore wind-solar-aquaculture integrated floater to sea floor, for station-keeping of the offshore wind-solar-aquaculture integrated floater on water surface; and four side frames of the cage are equipped with tensile nets, a bottom frame is equipped with a bottom net, the cage is further equipped with lifting rails, and the bottom net is connected to the lifting rails, to be movable up and down along the lifting rails to implement retraction and release of fish nets. The offshore wind-solar-aquaculture integrated floater has good stability. Water-plane structural components of the cage are mainly columns, and a total area of water planes is relatively small, so that wave loads on the offshore wind-solar-aquaculture integrated floater is small. The nets are mounted on the four side frames and the bottom frame of the cage, so that the entire net system may increase damping of the structure, and improve overall motion performance of the structure in ocean waves. The cage structure has high strength, and may be used in a deep sea area, so that the deployment zone of the cage structure is vast. Sea-keeping performance and stability of the offshore wind-solar-aquaculture integrated floater are outstanding, and the offshore wind-solar-aquaculture integrated floater can resist a natural weather in an extreme environment such as a typhoon, and especially, may be applicable to an ocean area of a water depth between 100 m and 200 m. In addition, the cage is used as a floating foundation of four vertical-axis wind turbine systems and the solar photovoltaic panels, utilization of an offshore wind farm and solar space above the cage is high, and electricity generation capacity is not only significant but also mutually complementary, so that ocean resources may be largely used, and the problem of electricity for offshore aquaculture may also be effectively resolved. In terms of economy, because the cage may not only form a huge fishery space, to implement a function of "fish farming below" and bring a considerable aquaculture income, but also can be used as the foundation of the four vertical-axis wind turbines, to implement a function of "power exploitation above". In addition, the total power of wind turbine electricity generation is great, and therefore the payback period of offshore wind power investments is greatly shortened. The bottom net may be designed to be retracted and released along the lifting rails, so that the net is flexibly retracted and released, which improves efficiency of aquaculture operations. Because the living and working quarter is constructed on the deck of the cage, the staff may perform activities such as fish farming, fishing catching, and wind turbine maintenance on the integrated structure. Great convenience is provided for using and maintaining the integrated structure, and efficiency and benefits are further improved.

The wind-solar-aquaculture floater integrates multiple vertical-axis wind turbines, solar photovoltaic panels, and a cube steel-fishing cage in the same structure. The offshore wind-solar-aquaculture integrated floater has good stability, good sea-keeping performance, high strength, and outstanding overall motion performance in waves, which can be used in vast deep sea areas, and solar electricity generation may be performed at sea. The combined wind turbines and solar panels on the cage form a mutually complementary system to generate electricity, which not only increases power generation efficiency but also helps to solve the problem of electricity demand by offshore fishery with ease. The volume of water contained by the steel-fishing cage is kept constant during offshore operations, which provides sufficient fishing space. The floater combines multiple wind turbines and solar panels with a steel fishing cage, which is an attractive approach to significantly reduce the long payback period of a floating wind turbine and meanwhile to achieve the goal of maximizing exploitation of offshore resources. In a preferable embodiment, the offshore wind-solar-aquaculture integrated floater is a spar-type structure. Its overall center of gravity of the structure is lower than its center of buoyancy, so that the structure is unconditionally stable, and of good hydrodynamic motion characteristics in waves due to small water plane areas. Damping performance is further improved because of the existence of the net.

In a preferable embodiment, the cage provides four separated triangular aquaculture regions, and a separation barrier, for example, a net, is placed between neighboring triangular aquaculture regions. The bottom net in each of the aquaculture regions may be individually retracted and released along the corresponding lifting rail. The four triangular aquaculture regions may be used to breed different species of aquatic fishes, or be provided with a net of different meshes according to sizes of fishes. The triangular aquaculture regions are suitable for breeding young fishes or adult fishes of different stages, and provide great flexibility to aquaculture.

In a preferable embodiment, at least one or more of the bottom crossed pontoons, the bottom side pontoons, lower middle portions of the corner columns, lower middle portions of the side columns, and a lower middle portion of the center column contain ballast tanks, and the ballast tanks may be filled with high-density metals and/or concretes for ballast purpose. In this way, the overall center of gravity of the offshore wind-solar-aquaculture integrated floater is lowered as required, to improve stability. Seawater may also be poured into the ballast tanks, to adjust the draught.

In a preferable embodiment, the electricity generators of the wind turbine systems are placed inside the corresponding corner columns, to not only save deck space but also lower the overall center of gravity of the offshore wind-solar-aquaculture integrated floater.

In a preferable embodiment, the aquaculture cage is a steel frame, which has high strength and rigidity, to further improve the capacity to resist severe marine environments.

DETAILED DESCRIPTION

The following further describes exemplary embodiments of the present invention in detail with reference to the accompanying drawings.

Figure 1:
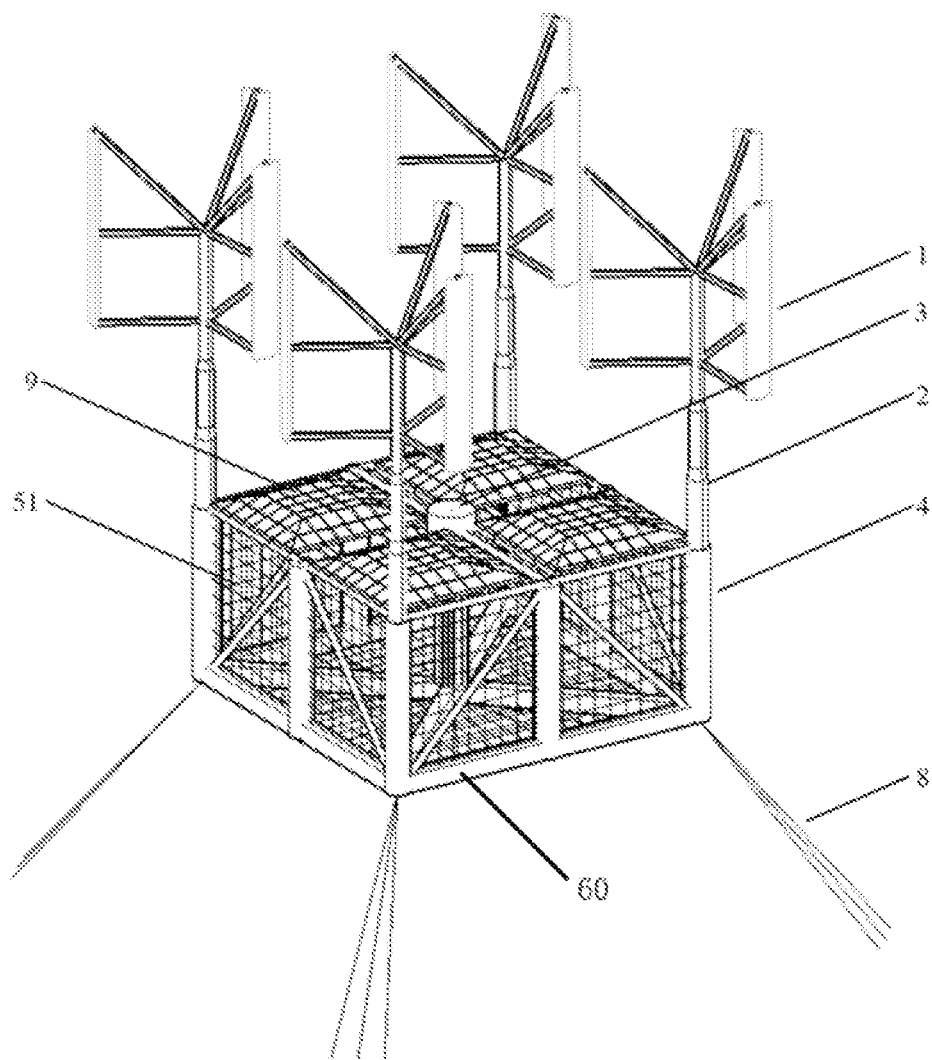
FIG. 1 is an isometric diagram of an offshore wind-solar-aquaculture integrated floater suitable for moderate and deep seas according to an embodiment of the present invention.
Figure 2:
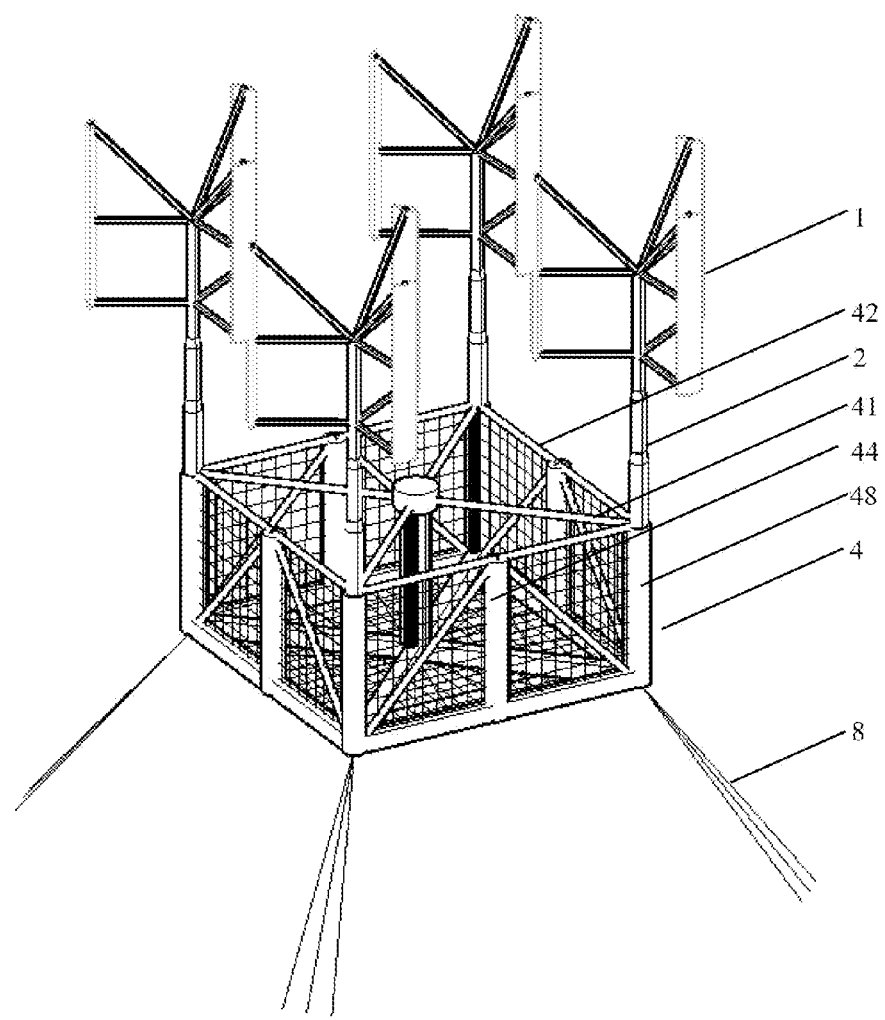
FIG. 2 is an isometric diagram of an offshore wind-solar-aquaculture integrated floater (in which solar photovoltaic panels and a truss support system are not included) suitable for moderate and deep seas according to an embodiment of the present invention.
Figure 3:
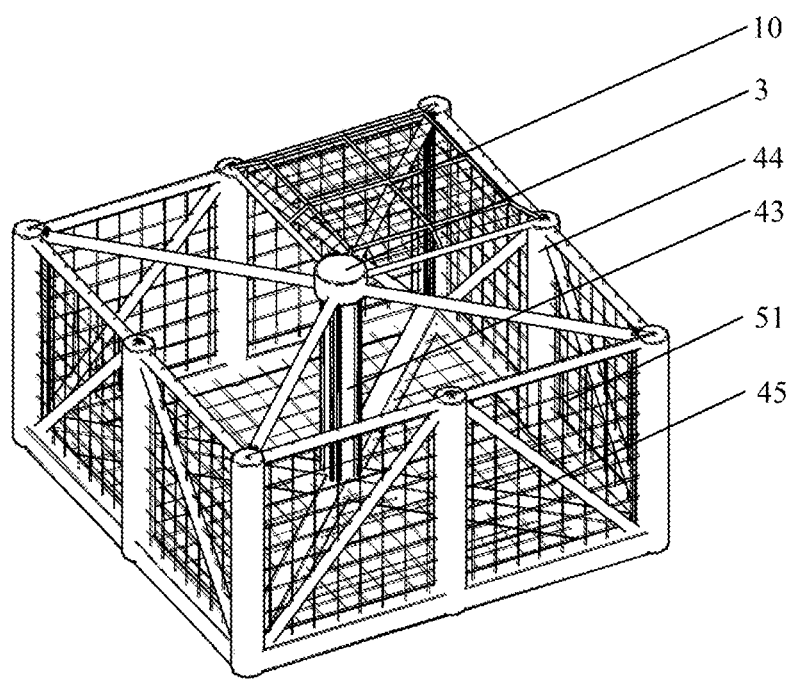
FIG. 3 is an isometric diagram of a cage according to an embodiment of the present invention.
Figure 4:
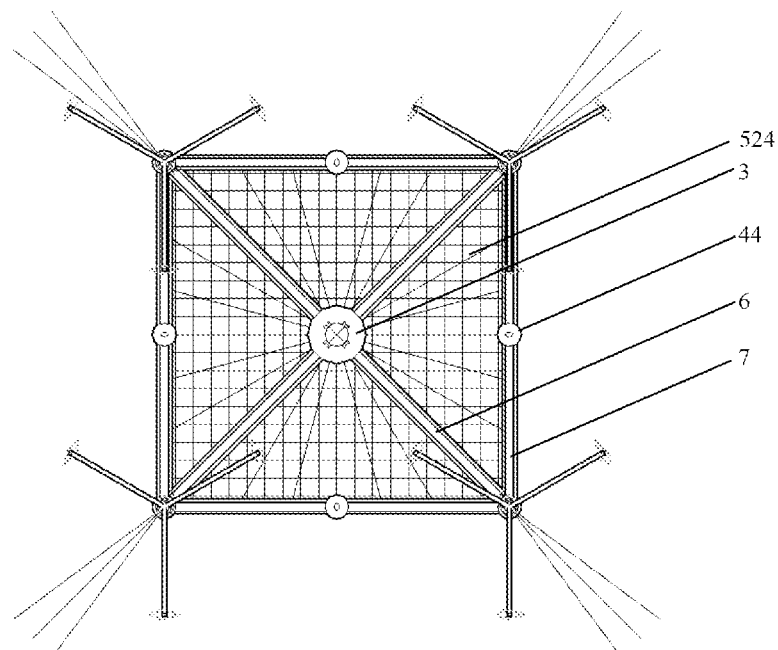
FIG. 4 is a top view of an offshore wind-solar-aquaculture integrated floater (in which solar photovoltaic panels and a truss support system are not included) suitable for moderate and deep seas according to an embodiment of the present invention.
Figure 5:
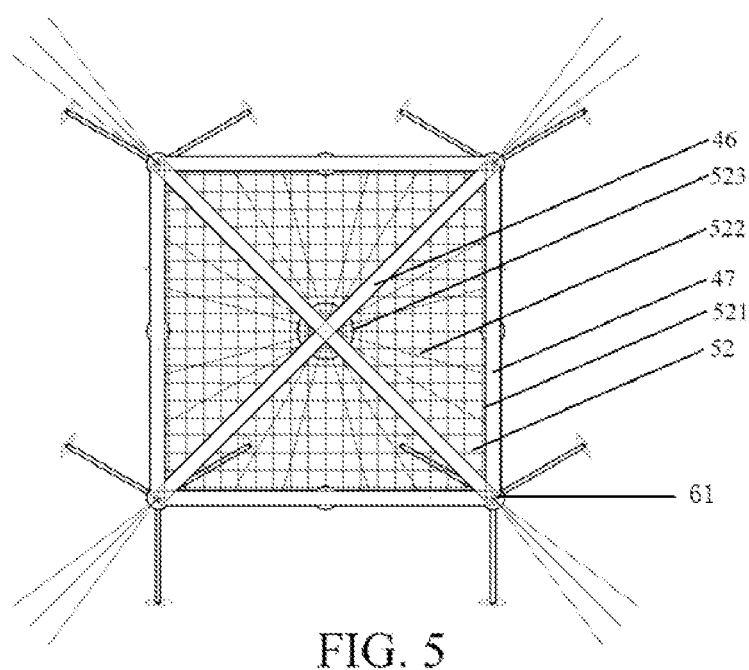
FIG. 5 is a bottom view of an offshore wind-solar-aquaculture integrated floater (in which solar photovoltaic panels and a truss support system are not included) suitable for moderate and deep seas according to an embodiment of the present invention.
Figure 6:
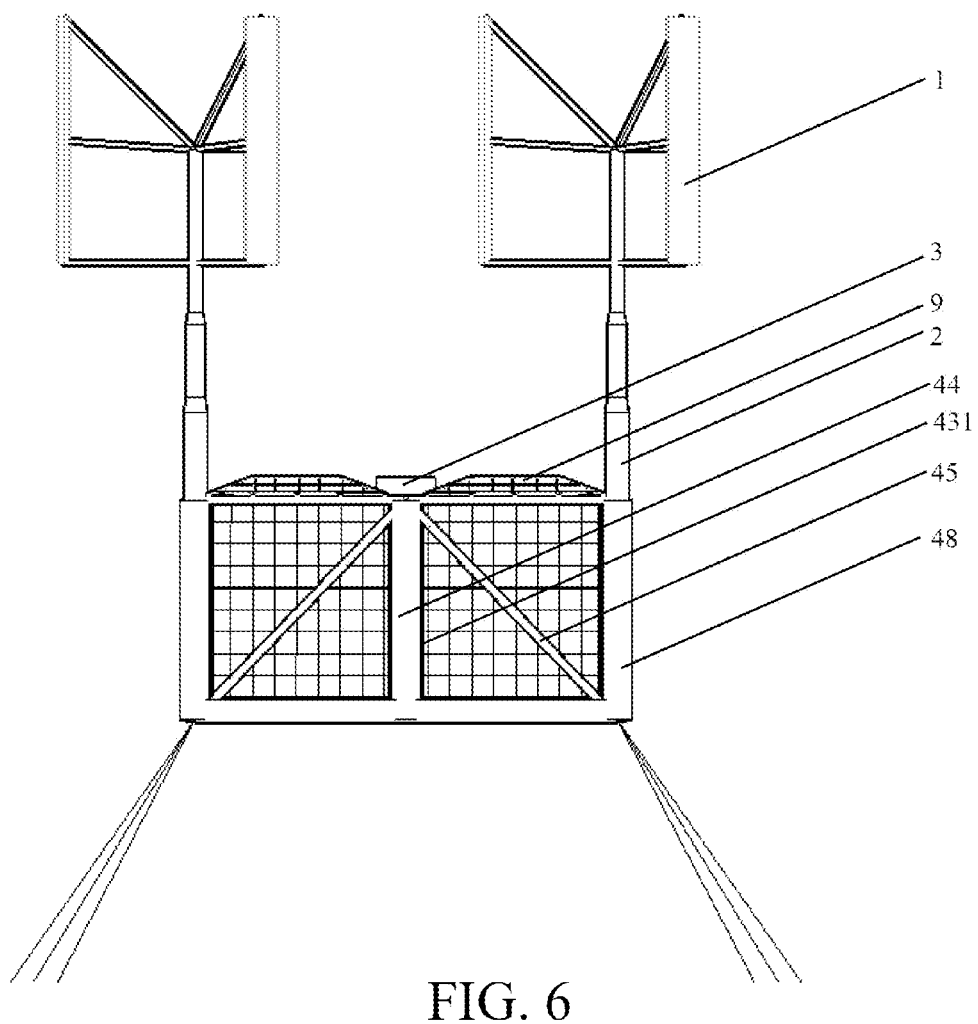
FIG. 6 is a front view of an offshore wind-solar-aquaculture integrated floater suitable for moderate and deep seas according to an embodiment of the present invention.
Figure 7:
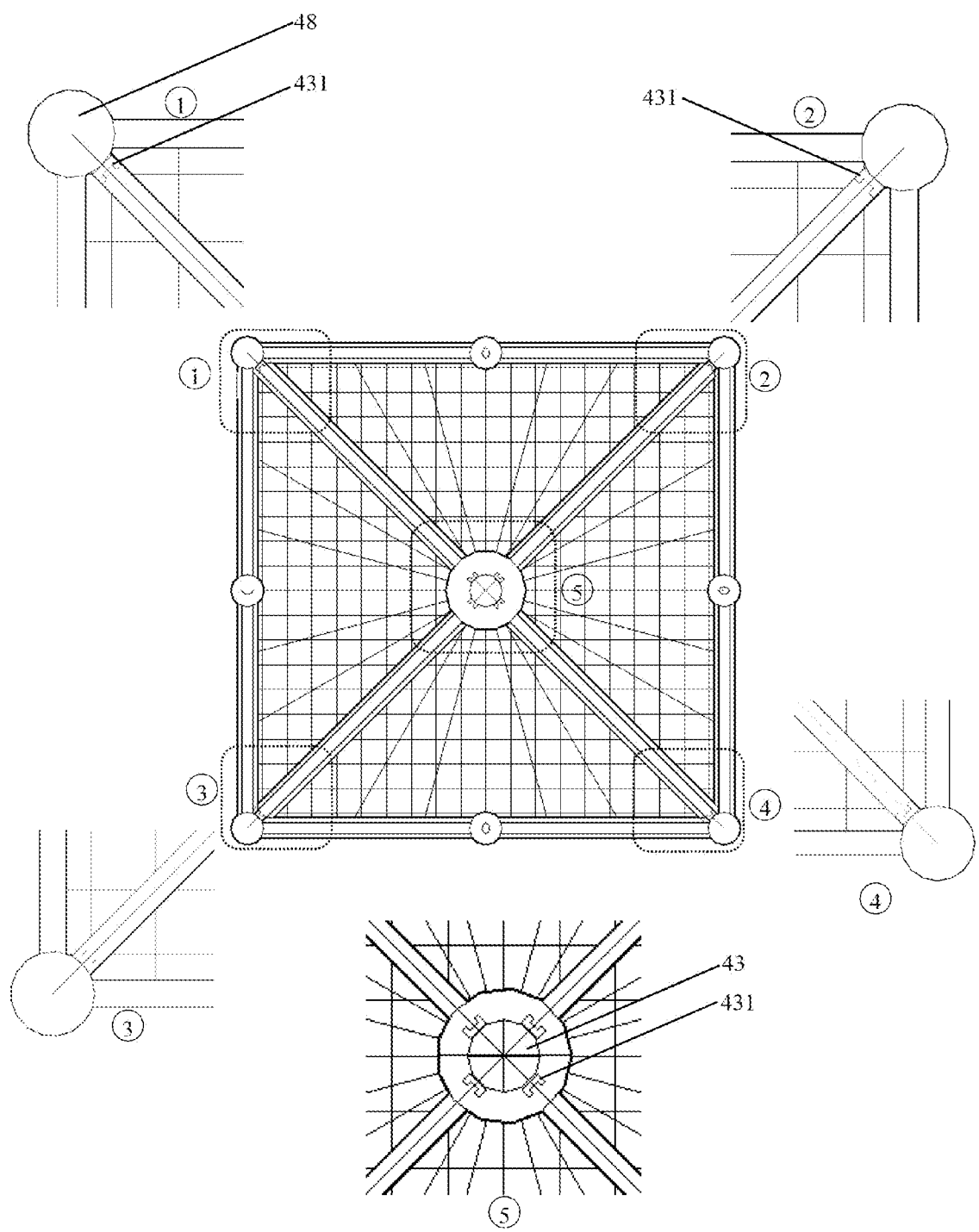
FIG. 7 is a top view of arrangement from columns to lifting rails according to an embodiment of the present invention, where marks ① to ⑤ respectively represent corresponding parts in which the lifting rails are located and partially enlarged effects thereof.

As shown in FIG. 1 to FIG. 7, in some embodiments, a offshore wind-solar-aquaculture integrated floater suitable for moderate and deep seas sequentially includes, from top to bottom, vertical-axis wind turbine systems 1, wind turbine towers 2, a living and working quarter 3, solar photovoltaic panels 9, decks 10, a cage 4, and a mooring system 8, where the cage 4 is a cube steel structure; the vertical-axis wind turbine systems 1 are rigidly connected to upper ends of the wind turbine towers 2, lower ends of the wind turbine towers 2 are rigidly connected to corner columns of the cage 4, and electricity generators of vertical-axis wind turbine systems are placed on the cage 4, preferably, placed inside the corner columns; the living and working quarter 3 is constructed at the central point of top crossed braces of the cage 4; the solar photovoltaic panels 9 are preferably fixed to the deck 10 of the cage 4 through a truss support system, and are in the shape of a truncated pyramid; and the mooring system 8 is connected to the cage 4, to play a role in mooring the entire offshore wind-solar-aquaculture integrated floater to sea floor. The cage 4 further includes a tensile net 51, a bottom net 52, and lifting rails 431. The tensile net 51 surrounds four side frames of the cage 4. The bottom net 52 is installed on the bottom frame of the cage 4, and are connected to the lifting rails 431 on corner columns 48 and a center column 43, to be movable up and down along the rails. Four vertical-axis wind turbines are mounted on an upper part of the cage 4.

The cage of the offshore wind-solar-aquaculture integrated floater has two functions. The cage not only can be used for fish farming, but also can act as the floating foundation for four vertical-axis wind turbines and the solar photovoltaic panels. The vertical-axis wind turbines and the photovoltaic panels generate electricity, of which a small amount is provided for aquaculture to resolve the problem of electricity supply for fishery usage particularly for distant seas, while an overwhelming majority of the electricity is incorporated into a nearby power grid and transferred further to coastal cities.

In some embodiments, as shown in FIG. 1 to FIG. 5, the cage 4 includes a center column 43, multiple corner columns 48, multiple top crossed braces 41, multiple top side braces 42, multiple side columns 44, multiple side braces 45, multiple bottom crossed pontoons 46, and multiple bottom side pontoons 47. Upper ends of corner columns 48 are rigidly connected to lower ends of the wind turbine towers 2; two ends of each of the top side braces 42 are respectively rigidly connected to upper ends of adjacent corner columns 48 and the side frame spar 44; two ends of each of the top crossed braces 41 are respectively rigidly connected to upper ends of adjacent corner columns 48 and the center column 43, and the top crossed braces 41 are in an "X" shape; all the top side braces 42 and the top crossed braces 41 are located in the same horizontal plane, to form the support for deck 10 of the cage 4. The deck 10 is perpendicular to the center column 43, the side columns 44, and the corner columns 48. One end of the side frame support 45 is rigidly connected to the upper end of the side frame spar 44, the other end is rigidly connected to a lower end of the corner column 48, and the side braces 45 are in an inverted "V" shape on each side frame. Two ends of each of the bottom side pontoons 47 are respectively rigidly connected to lower ends of two adjacent corner columns 48 and a lower end of the side column 44, two ends of each of the bottom crossed pontoons 46 are rigidly connected to lower ends of two adjacent corner columns 48 and a lower end of the center column 43, and all the bottom crossed pontoons 46 and the bottom side pontoons 47 are located in the same horizontal plane, to form the bottom frame of the cage 4. The bottom frame is perpendicular to the center column 43, the side columns 44, and the corner columns 48. Material properties and geometric sizes of all components of the same name are the same.

The mooring system 8 is connected to the cage 4 through fairleads 61 at the lower ends of the corner columns 48, to moor the entire floater to sea floor. Each of the bottom crossed pontoons 46, the bottom side pontoons 47, lower middle portions of the corner columns 48, lower middle portions of the side columns 44, and a lower middle portion of the center column 43 contain segmented ballast tanks 60.

In some embodiments, the living and working quarter 3 includes a living cabin, a working cabin, and a warehouse.

In some embodiments, the tensile net 51 surrounds four side frames of the cage 4, and this type of net is always in a tensioned state, aiming to ensure effective and constant aquaculture volumes of the cage 4. The bottom net 52 includes outer circumferential net ribs 521, multiple bottom radial net ribs 522, an inner circumferential net rib 523, and a net sheet, where the outer circumferential net ribs 521 form a periphery of the bottom net 52, the inner circumferential net rib 523 is located at a center portion of the bottom net 52 and surrounds the center column 43; the bottom radial net ribs 522 extend outwards at equal angles of 15 degrees along the inner circumferential net rib 523 until intersecting with the outer circumferential net ribs 521, and two ends of the bottom radial net rib 522 are respectively connected to the outer circumferential net ribs 521 and the inner circumferential net rib 523; and the net sheet is fixed to the outer circumferential net ribs 521, bottom radial net ribs 522, and the inner circumferential net rib 523.

In some embodiments, the lifting rails 431 are located on the corner columns 48 and the center column 43, and extend upwards from the lower ends of the corner columns 48 and the center column 43 to top ends of the corner columns 48 and the center column 43; and there is a lifting rail 431 on an inner side of each of the corner columns 48; and there are four lifting rails 431 on the center column 43 that are in four orientations of the southeast, the northeast, the southwest, and the northwest, the lifting rail 431 in each orientation of the center column 43 being opposite to the lifting rail 431 on the corner column 48.

In some embodiments, the bottom net 52 is connected to the lifting rails 431 on the corner columns 48 through the outer circumferential net ribs 521 and the bottom radial net ribs 522; and the bottom net 52 is connected to the lifting rails 431 on the center column 43 through the inner circumferential net rib 523 and the bottom radial net ribs 522. The bottom net 52 is movable up and down along the lifting rails, to realize retraction and release purposes.

In some embodiments, fishing operation corridors 7 are located on the top side braces 42, and fenders such as rubber fenders are located on outer sides of the top side braces, to help boats and ships dock. Guardrail passages 6 are mounted on the top crossed braces, and the passages 6 connect the fishing operation corridors 7 to the living and working quarter 3. The mooring system 8 is moored to the sea floor through fairleads on the cage 4. In addition, fishing operation corridors may also be located on the top crossed braces 41.

Construction of the offshore wind-solar-aquaculture integrated floater suitable for moderate and deep seas may be finished in a dry dock in advance. The cage is a centrally symmetric cube, so that each rigid frame on each side frame may be manufactured in advance in a steel factory, and then the overall assembly is completed. After the main body structure of the cage is completely assembled, the lifting rails on the center column and the inner sides of the corner columns, the living and working quarter above the center column, the solar photovoltaic panels, and the circumferential fishing operation corridors on deck of the cage may be mounted. The electricity generators, including control parts and transmission parts, of the vertical-axis wind turbine systems are all mounted in the corner columns of the cage, to lower the overall center of gravity of the structure. After the entire structure of the cage is completely assembled, the towers and the wind turbine systems of the vertical-axis wind turbines above the cage may be sequentially mounted in dock, and finally, the tensile net on the side frames and the bottom net are installed. After the entire offshore wind-solar-aquaculture integrated floater is completed in dry dock, water is poured into the dock, and the entire structure floats upwards under the action of its own buoyancy, and is towed to a predetermined offshore operation site by using tugs. Alternatively, the entire offshore wind-solar-aquaculture integrated floater may be transported to the expected offshore site on deck of a semi-submersible ship. After the offshore wind-solar-aquaculture integrated floater reaches the offshore site, the expected draught is then adjusted by pouring seawater into ballast tanks.

A small portion of electricity generated by the vertical-axis wind turbines and the photovoltaic panels is used for fishery usage and most of the electricity is transmitted to a nearby city through subsea cables. The aquaculture staff may acquire the real-time site sea conditions through a weather monitor system on the working quarter, and may make decisions on operations, such as bait throwing. A bait transport ship and an offshore wind power maintenance ship may be berthed beside the side braces wrapped by rubber fenders, to complete work such as bait transportation and wind turbine maintenance.

After the bred fishes have matured, the bottom net may be lifted through the lifting rails, and the fishes are pumped to a ship by using a long fish pumping tube. Then the bottom net is lowered to a working position through the lifting rails, to start next round of aquaculture work.

The foregoing content further describes the present invention in detail with reference to specific and exemplary embodiments, and the specification should not be construed as a limitation on the specific embodiments of the present invention. A person of ordinary skill in the art, to which the present invention belong, may make various replacements or variations on the described concept without departing from the principle of the present invention, and the replacements or variations should fall within the protection scope of the present invention. In the descriptions of this specification, descriptions using reference terms "an embodiment", "some embodiments", "an exemplary embodiment", "an example", "a specific example", or "some examples" mean that specific characteristics, structures, materials, or features described with reference to the embodiment or example are included in at least an embodiment or example of the present invention. In this specification, schematic descriptions of the foregoing terms do not necessarily pertain to the same embodiment or example. In addition, the described specific features, structures, materials, or features can be combined in a proper manner in any one or more embodiments or examples. In addition, in a case that is not mutually contradictory, a person skilled in the art can combine or group different embodiments or examples that are described in this specification and features of the different embodiments or examples. Although the embodiments and advantages of the present invention are described in detail, it should be understood that, various changes, replacements and variations may be made without departing from the scope defined by the appended claims. In addition, the scope of the present invention is not intended to limit specific embodiments of a process, machine, manufacturing, material composition, means, method, and step in this specification. A person of ordinary skills in the art easily understands that, the existing or to-be-developed process, machine, manufacturing, material composition, means, method, or step from the content of the disclosure, which performs the substantially identical function of the corresponding embodiments of this specification or obtains the substantially same result of the embodiments of this specification, may be used. Therefore, the scope of the appended claims includes the foregoing process, machine, manufacturing, material composition, means, method, or step.

What is claimed is:

1. An offshore wind-solar-aquaculture integrated floater suitable for moderate and deep seas, comprising, vertical-axis wind turbine systems, wind turbine towers, a living and working quarter, solar photovoltaic panels, a cage, and a mooring system, wherein
the cage is a cube, four vertical-axis wind turbine systems are respectively rigidly connected to four corners of the cage through corresponding wind turbine towers, and electricity generators of vertical-axis wind turbine systems are placed inside the main columns of the cage; the living and working quarter is constructed on the deck of the cage; the solar photovoltaic panels are arranged on the deck of the cage; and the mooring system is connected to the cage, and is designed to moor the offshore wind-solar-aquaculture integrated floater to sea floor, to keep a position of the offshore wind-solar-aquaculture integrated floater on predetermined water surface; and
four side frames of the cage are equipped with tensile nets, a bottom frame is equipped with a bottom net, the cage is equipped with lifting rails, and the bottom net is connected to the lifting rails, and are movable up and down along the lifting rails to implement retraction and release of the nets;
wherein the offshore wind-solar-aquaculture integrated floater is a spar-type structure, the cage comprising one or more bottom crossed pontoons, bottom side pontoons, corner columns, side columns, and a center column that contain ballast tanks, and an overall center of gravity of the spar-type structure is lower than a center of buoyancy of the spar-type structure such that the spar-type structure is unconditionally stable.

2. The offshore wind-solar-aquaculture integrated floater according to claim 1, wherein the cage comprises multiple top crossed braces, multiple top side braces, the center column, multiple of the side columns, multiple side braces, multiple of the bottom crossed pontoons, multiple of the bottom side pontoons, and multiple of the corner columns, wherein
the corner columns are located in four corners of the cage, lower ends of the wind turbine towers are rigidly connected to upper ends of the corner columns, and electricity generators of the wind turbine systems are placed inside the corner columns;
the side columns are located on the four side frames of the cage, and the center column is located in the center of the cage;
one end of each of the top side braces is rigidly connected to the upper end of the corner column, and the other end is rigidly connected to an upper end of the side column; one end of each of the top crossed braces is rigidly connected to the upper end of the corner column, and the other end is rigidly connected to an upper end of the center column, and the top crossed braces are in an "X" shape; all the top side braces and all the top crossed braces jointly form a top structure of the cage, and the center column, the corner columns, and the side columns are perpendicular to the top structure; and the living and working quarter is located at the intersection point of the top crossed braces;
multiple side braces are placed on the four side frames of the cage, one end of the side frame support is rigidly connected to the upper end of the side column, the other end is rigidly connected to a lower end of the corner column, and the side braces are in an inverted "V" shape on each side frame; and
one end of each of the bottom side pontoons is rigidly connected to the lower end of the corner column, and the other end is rigidly connected to a lower end of the side column; one end of each of the bottom crossed pontoons is rigidly connected to the lower end of the corner column, the other end is rigidly connected to a lower end of the center column, and the bottom crossed pontoons are in an "X" shape; all the bottom crossed pontoons and all the bottom side pontoons jointly form a bottom structure of the cage, and the center column, the corner columns, and the side columns are perpendicular to the bottom structure.

3. The offshore wind-solar-aquaculture integrated floater according to claim 2, wherein the cage is a steel cage, sizes and material properties of all components of the same name on the cage are the same, and the components of the same name are symmetrically distributed about the center column in spatial locations.

4. The offshore wind-solar-aquaculture integrated floater according to claim 2, wherein the mooring system is connected to the cage through fairleads at the lower ends of the corner columns.

5. The offshore wind-solar-aquaculture integrated floater according to claim 2, wherein the lifting rails are located on the corner columns and the center column, and extend upwards from the lower ends of the corner columns and the center column to top ends of the corner columns and the center column; and there is a lifting rail on an inner side of each of the corner columns respectively; and there are four lifting rails on the center column that are in four orientations of the southeast, the northeast, the southwest, and the northwest, the lifting rail in each orientation of the center column being located opposite to the lifting rail on the corner column.

6. The offshore wind-solar-aquaculture integrated floater according to claim 1, wherein the bottom net comprises of multiple outer circumferential net ribs, multiple bottom radial net ribs, an inner circumferential net rib, and a net sheet, wherein the outer circumferential net ribs form a periphery of the bottom net, the inner circumferential net rib is located at a center portion of the bottom net and surrounds the center column; the bottom radial net ribs radiate outwards at equal angles along the inner circumferential net rib, and two ends of the bottom radial net rib are respectively connected to the outer circumferential net ribs and the inner circumferential net rib; and the net sheet is fixed to the outer circumferential net ribs, the bottom radial net ribs, and the inner circumferential net rib.

7. The offshore wind-solar-aquaculture integrated floater according to claim 6, wherein the bottom net is connected to the lifting rails through the outer circumferential net ribs and the bottom radial net ribs.

8. The offshore wind-solar-aquaculture integrated floater according to claim 6, wherein the inner space of the cage is divided into four triangular aquaculture regions by the corner columns, the center column, the top crossed braces, the top side braces, the bottom crossed pontoons, and the bottom side pontoons, a separation barrier is placed between neighboring triangular aquaculture regions, and the bottom net in each of the aquaculture regions is individually retracted and released along the corresponding lifting rail.

9. The offshore wind-solar-aquaculture integrated floater according to claim 1, wherein the solar photovoltaic panels are installed onto the deck of the cage, and are in the shape of a truncated pyramid.

\* \* \* \* \*